(12) United States Patent
Zhang (10) Patent No.: US 10,509,710 B2
(45) Date of Patent: Dec. 17, 2019

(54) METHOD, TERMINAL, DEVICE AND COMPUTER READABLE STORAGE MEDIUM FOR IMPROVING THE PERFORMANCE OF VIRTUAL MACHINE

(71) Applicant: Ping An Technology (Shenzhen) Co., Ltd., Shenzhen, Guangdong (CN)

(72) Inventor: Qiguo Zhang, Guangdong (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 125 days.

(21) Appl. No.: 15/578,702

(22) PCT Filed: Mar. 14, 2017

(86) PCT No.: PCT/CN2017/076522
§ 371 (c)(1),
(2) Date: Nov. 30, 2017

(87) PCT Pub. No.: WO2018/014567
PCT Pub. Date: Jan. 25, 2018

(65) Prior Publication Data
US 2019/0227891 A1    Jul. 25, 2019

(30) Foreign Application Priority Data
Jul. 22, 2016  (CN) .......................... 2016 1 0584166

(51) Int. Cl.
*G06F 11/00*  (2006.01)
*G06F 11/20*  (2006.01)
(Continued)

(52) U.S. Cl.
CPC ...... *G06F 11/2094* (2013.01); *G06F 9/45558* (2013.01); *G06F 11/0793* (2013.01);
(Continued)

(58) Field of Classification Search
CPC ............. G06F 11/1469; G06F 11/1484; G06F 11/2053; G06F 11/2056; G06F 11/2069;
(Continued)

(56) References Cited

U.S. PATENT DOCUMENTS

| 6,353,452 B1 | 3/2002 | Hamada et al. |
| 7,389,379 B1 * | 6/2008 | Goel .................... G06F 11/1662 711/112 |

(Continued)

FOREIGN PATENT DOCUMENTS

| CN | 101609419 A | 12/2009 |
| CN | 103309763 A | 9/2013 |

(Continued)

OTHER PUBLICATIONS

Weil et al., "Ceph: A Scalable, High-Performance Distributed File System", OSI '06: 7th USENIX Symposium on Operating Systems Design and Implementation, pp. 307-320 (Year: 2006).*
(Continued)

*Primary Examiner* — Michael Maskulinski (57) ABSTRACT

Disclosed are a method, a terminal, a device, and a computer readable storage medium for improving the performance of a virtual machine. The method includes determining whether a failure of a disk of a host having a virtual disk file stored therein occurs if a virtual machine sends a read request or a write request to the virtual disk file; sending the read or write request to a storage device which is associated with the host and has the virtual disk file stored therein if the failure occurs, so that the storage device is able to feed back data; detecting whether the disk of the host is recovered if the data fed back from the write request is received; and writing the data fed back from the write request into the disk of the host if the disk of the host is recovered.

12 Claims, 4 Drawing Sheets

(51) Int. Cl.
*G06F 11/14* (2006.01)
*G06F 11/07* (2006.01)
*G06F 9/455* (2018.01)

(52) U.S. Cl.
CPC .......... *G06F 11/14* (2013.01); *G06F 11/1469* (2013.01); *G06F 11/1484* (2013.01); *G06F 2009/45575* (2013.01); *G06F 2009/45583* (2013.01); *G06F 2201/815* (2013.01); *G06F 2201/82* (2013.01)

(58) Field of Classification Search
CPC ............. G06F 11/2094; G06F 9/45558; G06F 9/45562
See application file for complete search history.

(56) References Cited

U.S. PATENT DOCUMENTS

| | | | | |
|---|---|---|---|---|
| 8,307,177 | B2* | 11/2012 | Prahlad | G06F 11/1453 |
| | | | | 711/162 |
| 8,819,369 | B1* | 8/2014 | Alappat | G06F 9/45558 |
| | | | | 711/162 |
| 8,875,134 | B1 | 10/2014 | van der Goot | |
| 9,424,151 | B2* | 8/2016 | Lakshman | G06F 11/2058 |
| 2006/0107085 | A1 | 5/2006 | Daniels et al. | |
| 2010/0011178 | A1* | 1/2010 | Feathergill | G06F 11/1466 |
| | | | | 711/162 |
| 2012/0016840 | A1* | 1/2012 | Lin | G06F 11/2097 |
| | | | | 707/626 |
| 2012/0324183 | A1 | 12/2012 | Chiruvolu et al. | |
| 2015/0378857 | A1 | 12/2015 | Sevigny et al. | |
| 2016/0004611 | A1 | 1/2016 | Lakshman et al. | |
| 2016/0085574 | A1* | 3/2016 | Dornemann | G06F 3/0664 |
| | | | | 718/1 |
| 2017/0193003 | A1* | 7/2017 | Vijayan | G06F 16/27 |

FOREIGN PATENT DOCUMENTS

| | | |
|---|---|---|
| CN | 103559108 A | 2/2014 |
| CN | 103885719 A | 6/2014 |
| CN | 103902349 A | 7/2014 |
| CN | 104268038 A | 1/2015 |
| CN | 104899071 A | 9/2015 |
| CN | 105103132 A | 11/2015 |
| CN | 105224391 A | 1/2016 |
| CN | 102662751 B | 5/2016 |
| CN | 105607973 A | 5/2016 |
| CN | 106445730 A | 2/2017 |

OTHER PUBLICATIONS

Examination Report of Australian Patent Application No. 2017265044 dated Oct. 16, 2018.
Supplementary European Search Report of European Patent Application No. 17851948.4 dated Nov. 30, 2018.
Nritten Opinion of Singaporean Patent Application No. 11201709610S dated Apr. 16, 2018.

* cited by examiner

METHOD, TERMINAL, DEVICE AND COMPUTER READABLE STORAGE MEDIUM FOR IMPROVING THE PERFORMANCE OF VIRTUAL MACHINE

FIELD OF INVENTION

The present disclosure relates to the technical field of cloud computing, in particular to a method, a terminal, a device, and a computer readable storage medium for improving the performance of a virtual machine.

BACKGROUND OF INVENTION

In the virtual machine disk provided by the cloud platform, a ceph (a distributed file system) or a centralized network storage is generally used as backend storage. If a virtual memory cluster of the ceph is down, the operation of all virtual machines will be interrupted. Further, a storage access congestion usually occurs when the virtual machine accesses the ceph network storage or disk for business operations at the I/O peak time.

SUMMARY OF THE INVENTION

Therefore, it is a primary objective of the present disclosure to provide a method, a terminal, a device, and a computer readable storage medium of improving the performance of a virtual machine.

To achieve the aforementioned and other objectives, the present disclosure discloses a method for improving the performance of a virtual machine, and the method includes the steps of: determining whether or not a failure of a disk of a host having a virtual disk file stored therein occurs if a virtual machine sends a read request or a write request to the virtual disk file; sending the read request or the write request to a storage device which is associated with the host and has the virtual disk file stored therein if the failure occurs, so that the storage device can feed back the corresponding data; detecting whether or not a corresponding disk of the host is recovered if the data fed back from the write request is received; and writing the data fed back from the write request into the corresponding disk of the host if the disk of the host is recovered.

To achieve the aforementioned and other objectives, the present disclosure also discloses a terminal comprising: a determination unit, for determining whether or not a failure of the disk of the host having the virtual disk file stored therein occurs if the virtual machine sends a read request or a write request to the virtual disk file; a request transmitting unit, for sending the read request or write request to a storage device which is associated with the host and has the virtual disk file stored therein if a failure of the disk of the host occurs, so that the storage device can feed back the corresponding data; a detection unit, for detecting whether or not the disk of the host is recovered if the data fed back from the write request is received; and a synchronous writing unit, for writing the data fed back from the write request into the corresponding disk of the host if the disk of the host is recovered.

To achieve the aforementioned and other objectives, the present disclosure also discloses a device comprising: a processor, and an input device, an output device, and a memory, coupled to the processor; wherein the input device is provided for a user to input a read request or a write request into a virtual disk file; the output device is provided for outputting the data fed back from the read request or write request; the memory is provided for storing the program data of the host and the storage device associated with the host, the read request or write request, and other callable and operable program data; and the processor is provided for calling the program data stored in the memory and executing the steps of: determining whether or not a failure of the disk of the host having the virtual disk file stored therein occurs if the virtual machine sends a read request or a write request to the virtual disk file; sending the read request or write request to the storage device which is associated with the host and has the virtual disk file stored therein if a failure occurs, so that the storage device can feed back the corresponding data to the storage device; detecting whether or not the corresponding disk of the host is recovered if the data fed back from the write request is received; and writing the data fed back from the write request into a corresponding disk drive of the host if the corresponding disk of the host is recovered.

To achieve the aforementioned and other objectives, the present disclosure also discloses a computer readable storage medium provided for storing one or more programs executed by one or more processors, and executing the steps of: determining whether or not a failure of the disk of the host having the virtual disk file stored therein occurs if the virtual machine sends a read request or a write request to the virtual disk file; sending the read request or write request to a storage device which is associated with the host and has the virtual disk file stored therein if a failure occurs, so that the storage device can feed back the corresponding data to the storage device; detecting whether or not the corresponding disk of the host is recovered if the data fed back from the write request is received; and writing the data fed back from the write request into a corresponding disk drive of the host if the corresponding disk of the host is recovered.

In the embodiments of the present disclosure, the method, terminal, device, and computer readable storage medium assure the normal operation of the virtual machines when a failure of the disk that stores the virtual disk file occurs.

BRIEF DESCRIPTION OF THE DRAWINGS

The present disclosure will become clearer in light of the following detailed description of an illustrative embodiment of this disclosure described in connection with the drawings.

DESCRIPTION OF THE EMBODIMENTS

The above and other objects, features and advantages of this disclosure will become apparent from the following detailed description taken with the accompanying drawings. Only some embodiments of the present disclosure have been illustrated in the drawings, but it should be pointed out that many other modifications are conceivable within the scope of the following claims.

It should be understood that the terms used in this specification and claims such as "comprising" and "including" refer to the existence of the described characteristics, steps, operations, elements and/or components, without excluding one or more other characteristics, steps, operations, elements and/or components, or the existence or addition of their sets.

Figure 1:
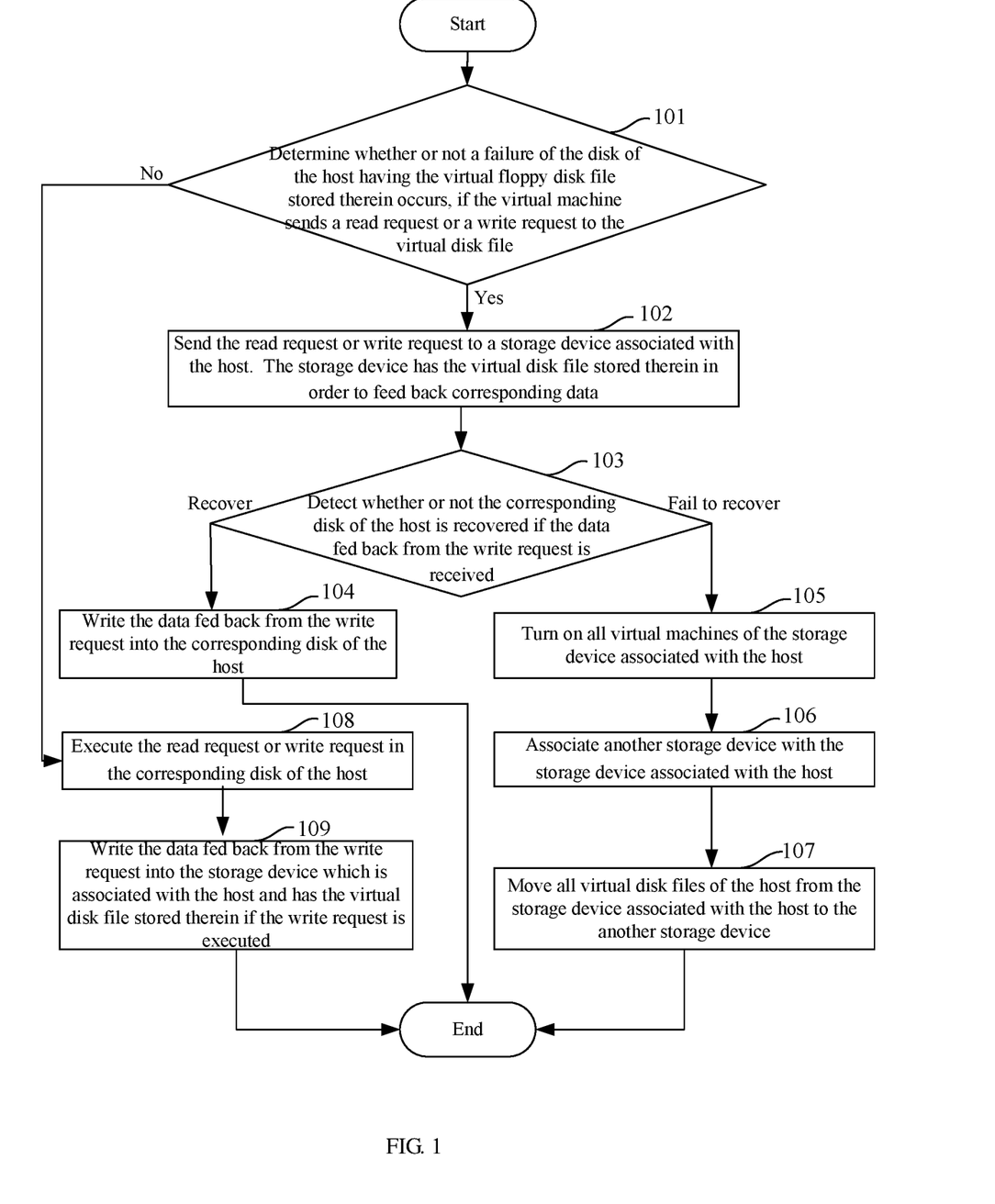
FIG. 1 is a flow chart of a method for improving the performance of a virtual machine in accordance with an embodiment of the present disclosure.

With reference to FIG. 1 for a flow chart of a method for improving the performance of a virtual machine in accordance with an embodiment of the present disclosure, the method comprises the following steps S101-S109.

S101: Determine whether or not a failure of the disk of the host having the virtual disk file stored therein occurs, if the virtual machine sends a read request or a write request to the virtual disk file. If a failure occurs, then execute S102, or else execute S108.

If a write request is sent without a corresponding virtual disk file of the write request, then a corresponding virtual disk file will be added; and if the write request is sent but there is a virtual disk file corresponding to the write request, then the corresponding virtual disk file will be overwritten.

S102: Send the read request or write request to a storage device associated with the host. The storage device has the virtual disk file stored therein in order to feed back corresponding data. In the host, an associated relationship between the host and the storage device is stored. If the storage device is a standalone device, the associated relationship includes an IP address of the storage device. Specifically, the read request or write request is sent to a storage device associated with the host via a network, and the storage device sends the corresponding fed back data to the host via the network. The storage device has a virtual disk file stored in the host, and the host also keeps the virtual disk file in the storage device. Preferably, the storage device and the host are located at the same switch or in the same network, so that the transmission rate of the network becomes greater, and the read request or write request can be sent to the storage device associated with the host with a faster speed without delaying the transmission via the network. If the storage device is a virtual memory cluster, an associated relationship between the host and the virtual memory cluster will be stored in the host, wherein the associated relationship includes an IP address, and a storage capacity of the virtual memory cluster. The virtual memory cluster has a virtual disk file stored therein, so that the virtual memory cluster can feed back the corresponding data of the read request or write request. Preferably, the host can visit the virtual memory cluster by calling the corresponding program.

S103: detecting whether or not the corresponding disk of the host is recovered if the data fed back from the write request is received. If the disk of the host is recovered, then execute S104, or else execute S105. Preferably, if the corresponding disk of the host has not been recovered within a predetermined time, the failure of the corresponding disk of the host is considered to be unrecoverable. The predetermined time is preferably 10 days.

S104: Write the data fed back from the write request into the corresponding disk of the host. If the data is returned from the read request and the read request has not changed the content of the virtual disk file, it is not necessary to write the data fed back from the read request into the corresponding disk of the host anymore. Since the write request is executed, the content of the virtual disk file may be changed, so that it is necessary to write the data fed back from the read request into the corresponding disk of the host in order to ensure that the content of the host and the content of the virtual disk file of the storage device associated with the host are consistent.

The steps S101~S104 achieve the effect of sending the read request or write request of the virtual disk file to the storage device which is associated with the host and has the virtual disk file stored therein in order to feed back the corresponding data when a failure of the disk of the host having the virtual disk file stored therein occurs. After the corresponding disk of the host is recovered, the data fed back from the read request is written into the corresponding disk of the host, so as to ensure the normal operation of the virtual machine when a failure of the host occurs to interrupt the operation of virtual machine.

S105: Turn on all virtual machines of the storage device associated with the host. If the failure of the corresponding disk drive of the host cannot be recovered, then all virtual machines of the storage device associated with the host including the virtual machine of the storage device and the storage device will be turned on directly to prevent a too-long interrupt time of the virtual machine, which may affect the I/O operation of the virtual machine.

S106: Associate another storage device with the storage device associated with the host.

S107: Move all virtual disk files of the host from the storage device associated with the host to the another storage device.

Associate another storage device with the storage device associated with the host while moving all virtual disk files of the host from the storage device associated with the host to another storage device if the failed disk of the host cannot be recovered, so as to prevent losing the virtual disk file of the host or interrupting the operation of the virtual machine of the host for a long time.

S108: Execute the read request or write request in the corresponding disk of the host. If there is no failure of the corresponding disk of the host, the read request or write request will be executed in the corresponding disk of the host.

S109: Write the data fed back from the write request into the storage device associated with the host if the write request is executed, so that the storage device has the virtual disk file stored therein. If the data is fed back from the read request, it will not be necessary to write the data fed back from the read request into the corresponding disk of the host since the read request has not changed the content of the virtual disk file. After the write request is executed, it is highly probably that the content of the virtual disk file is changed, and it is necessary to write the data fed back from the read request into the corresponding disk of the host to ensure that the content of the host and the content of the virtual disk file of the storage device associated with the host are consistent.

If there is no failure in the disk of the host that stores the virtual disk file, the read request or write request will be executed in the host, and the data fed back from the write request will be written into the storage device associated with the host.

Figure 2:
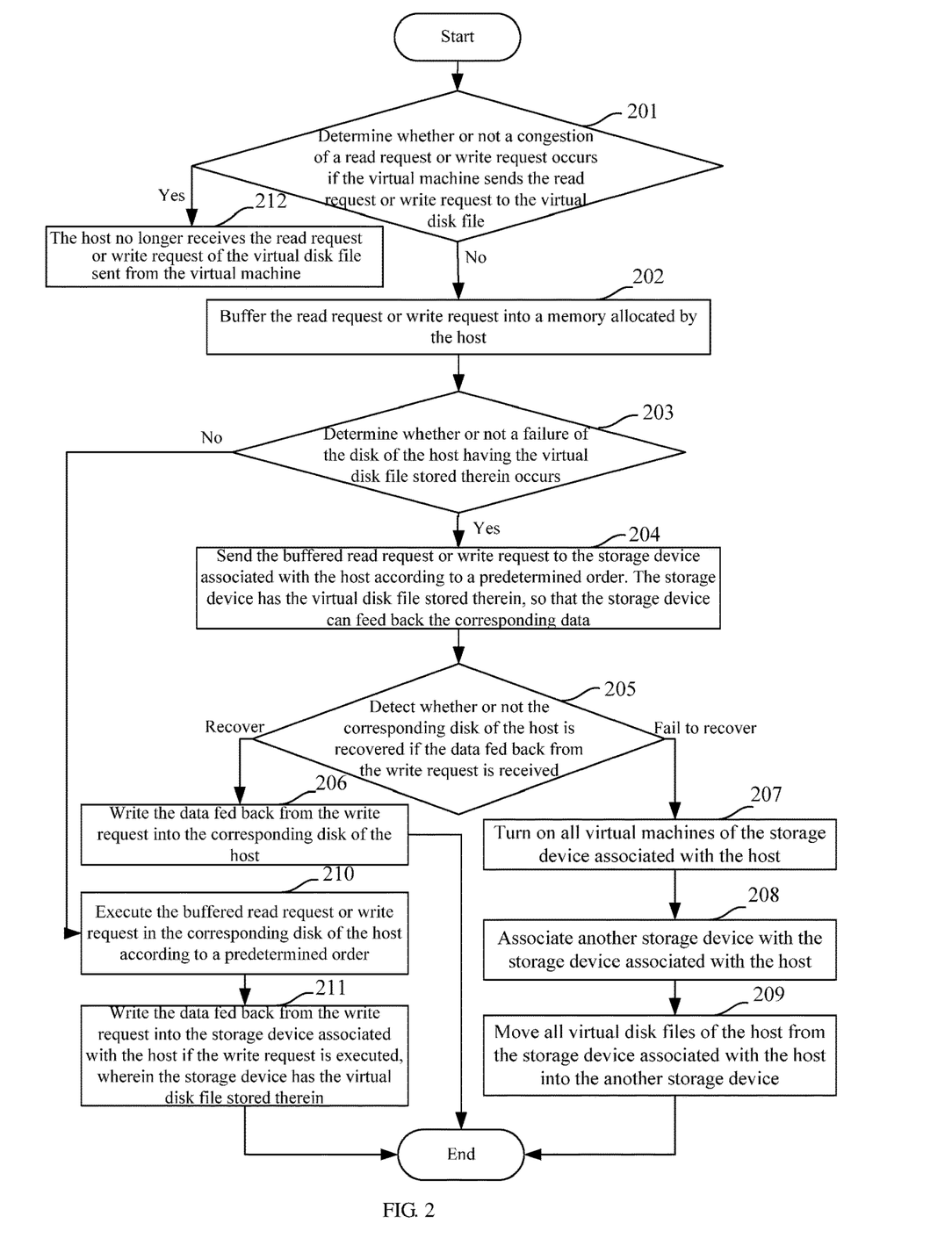
FIG. 2 is a flow chart of a method for improving the performance of a virtual machine in accordance with another embodiment of the present disclosure.

With reference to FIG. 2 for a flow chart of a method for improving the performance of a virtual machine in accordance with another embodiment of the present disclosure, the method includes the following steps S201~S211.

S201: Determine whether or not a congestion of a read request or write request occurs if the virtual machine sends the read request or write request to the virtual disk file. If the congestion occurs, then execute S212, or else execute S202. If the write request is sent but there is no virtual disk file corresponding to the write request, then a corresponding virtual disk document will be added; and if the write request is sent but there is a virtual disk file corresponding to the write request, then a corresponding virtual disk document will be overwritten.

S202: Buffer the read request or write request into a memory allocated by the host. The built-in memory allocated by the host includes a static shared memory and a dynamic shared memory. Wherein, the static shared memory has a fixed capacity and a fast access speed; and the dynamic shared memory has a capacity variable dynamically with the change of the data size and an access speed slower than the access speed of the static shared memory.

Figure 3:
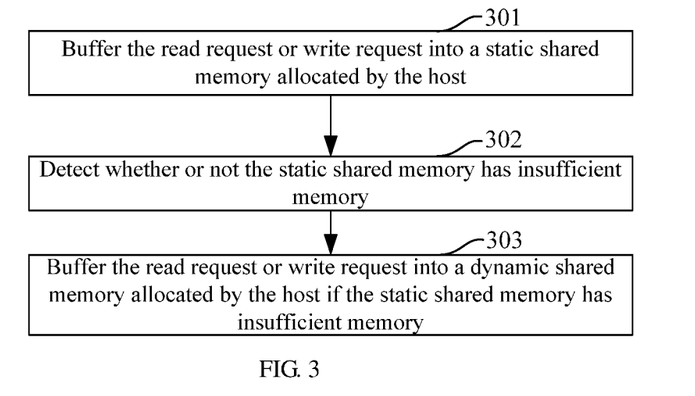
FIG. 3 is a flow chart of Step S202.

In FIG. 3, the step S202 includes S301~S303.

S301: Buffer the read request or write request into a static shared memory allocated by the host.

S302: Detect whether or not the static shared memory has insufficient memory.

S303: Buffer the read request or write request into a dynamic shared memory allocated by the host if the static shared memory has insufficient memory.

S203: Determine whether or not a failure of the disk of the host having the virtual disk file stored therein occurs. If a failure occurs, then execute S204, or else execute S210.

S204: Send the buffered read request or write request to the storage device, which is associated with the host and has a virtual disk file stored therein, according to a predetermined order, so that the storage device can feed back the corresponding data. Wherein, the predetermined order is preferably the time sequence of generating the read request or write request.

S205: Detect whether or not the corresponding disk of the host is recovered if the data fed back from the write request is received. If the disk of the host is recovered, then execute S206, or else execute S207. Preferably, the corresponding failed disk of the host is considered to be unrecoverable if the recovery of the corresponding disk of the host cannot be made within a predetermined time, wherein the predetermined time is preferably 10 days.

S206: Write the data fed back from the write request into the corresponding disk of the host. If the data is fed back from the read request, it will not be necessary to write the data fed back from the read request into the corresponding disk of the host since the read request has not changed the content of the virtual disk file. When the write request is executed, it is highly probably that the content of the virtual disk file is changed, so that it is necessary to write the data fed back from the read request into the corresponding disk of the host to ensure that the content of the host and the content of the virtual disk file of the storage device associated with the host are consistent.

S207: Turn on all virtual machines of the storage device associated with the host. If the failure of the corresponding disk drive of the host cannot be recovered, then all virtual machines of the storage device associated with the host (including the virtual machines of the storage device and the virtual machines of the host stored in the storage device) will be turned on directly, so as to prevent a too-long interrupt time of the virtual machine, which will affect the I/O operation of the virtual machine.

S208: Associate another storage device with the storage device associated with the host.

S209: Move all virtual disk files of the host from the storage device associated with the host into the other storage device.

If the failure of the corresponding disk of the host cannot be recovered, then another storage device is associated with the storage device associated with the host, while moving all virtual disk files of the host from the storage device associated with the host to another storage device, so as to prevent losing the virtual disk file of the host and prevent failing to maintain the normal operation of the virtual machine of the host.

S210: Execute the buffered read request or write request in the corresponding disk of the host according to a predetermined order.

Wherein, the predetermined order is preferably a time sequence for generating the read request or write request.

S211: Write the data fed back from the write request into the storage device associated with the host if the write request is executed, wherein the storage device has the virtual disk file stored therein. If the data is fed back from the read request, and the read request has not changed the content of the virtual disk file, therefore it is not necessary to write the data fed back from the read request into the storage device associated with the host anymore. Since the write request is executed, it is highly probably that the content of the virtual disk file is changed, and it is necessary to write the data fed back from the read request into the storage device associated with the host in order to ensure that the content of the host and the content of the virtual disk file of the storage device associated with the host are consistent.

S212: The host no longer receives the read request or write request of the virtual disk file sent from the virtual machine.

In this embodiment, it is determined whether or not a congestion of the read request or write request occurs after the virtual machine has sent a read request or a write request to the virtual disk file. If there is no congestion, the read request or write request will be buffered into a memory allocated by the host, and then the read request or write request will be executed according to a predetermined order to ensure the balance of I/O visits made by the disk. If there is a congestion, the read request or write request sent from the virtual machine for the virtual disk file will not be received anymore to prevent the issue of congestion of the visits made by the disk when there is a congestion of the read request or write request.

People having ordinary skill in the art can understand the whole or a part of the steps of the embodiment can be accomplished by hardware or accomplished by hardware which is driven by the instruction of a program, and the program may be stored in a computer readable storage medium, and the aforementioned storage medium may be a read only memory, a disk, or an optical disk, etc.

Figure 4:
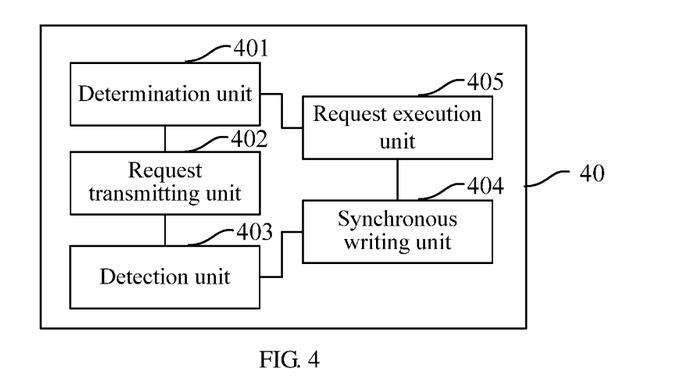
FIG. 4 is a schematic block diagram of a terminal in accordance with a first embodiment of the present disclosure.

With reference to FIG. 4 for a schematic block diagram of a terminal in accordance with an embodiment of the present disclosure, the terminal 40 includes a determination unit 401, a request transmitting unit 402, a detection unit 403, a synchronous writing unit 404, and a request execution unit 405.

The determination unit 401 is provided for determining whether or not a failure of the disk of the host having the virtual disk file stored therein occurs if the virtual machine sends a read request or a write request to the virtual disk file. If the write request is sent but there is no virtual disk file corresponding to the write request, a corresponding virtual disk file will be added; and if the write request is sent but there is a virtual disk file corresponding to the write request, then the corresponding virtual disk file will be overwritten.

The request transmitting unit 402 is provided for sending the read request or write request to the storage device which is associated with the host and has the virtual disk file stored therein if a failure of the disk stored in the virtual disk file of the host occurs, so that the storage device can feed back the corresponding data. An associated relationship between the host and the storage device is pre-stored in the host. If the storage device is a standalone device, the associated relationship will include an IP address of the storage device, etc. Specifically, the read request or write request is sent to the storage device associated with the host via a network, and the storage device returns the corresponding feedback data to the host via the network. The storage device has the virtual disk file of the host stored therein, while the host also has the virtual disk file stored in the storage device at the same time. Preferably, the storage device and the host are situated at the same switch, or the same network, so that the transmission rate of the network is greater, and the read request or write request can be sent to the storage device associated with the host more quickly without any delay of the network transmission. If the storage device is a virtual memory cluster, the associated relationship between the host and the virtual memory is pre-stored in the host, wherein the associated relationship includes the IP address and the storage capacity of the virtual memory cluster, etc. The virtual memory cluster has the virtual disk file stored therein, so that the virtual memory cluster can feed back the data of the corresponding read request or write request to the host. Preferably, the host can visit the virtual memory cluster by calling the corresponding program library.

The detection unit 403 is provided for detecting whether or not the corresponding disk of the host is recovered if the data fed back from the write request is received.

The synchronous writing unit 404 is provided for writing the data fed back from the write request into the corresponding disk of the host if the disk of the host is recovered. If the data is returned by the read request, it will not be necessary to write the data fed back from the read request into the corresponding disk drive of the host since the read request has not changed the content of the virtual disk file. Since the write request is executed, it is highly probably that the content of the virtual disk file is changed, so that it is necessary to write the data fed back from the write request into the corresponding disk of the host in order to ensure that the content of the host and the content of the virtual disk file of the storage device associated with the host are consistent.

The aforementioned determination unit 401, request transmitting unit 402, detection unit 403, and synchronous writing unit 404 achieve the effect sending the read request or write request of the virtual disk file to the storage device associated with the host in order to feed back corresponding data when a failure of the disk of the host that stores the virtual disk file occurs, and the storage device has the corresponding virtual disk file therein, so that after the failed disk of the host is recovered, the data fed back from the read request will be written into the corresponding disk of the host, so as to prevent interrupting the operation of the virtual machine when the host fails and ensure the normal operation of the virtual machine.

The request execution unit 405 is provided for executing the read request or write request in the corresponding disk of the host if no failure of the disk stored in the virtual disk file of the host occurs.

The synchronous writing unit 404 is provided for writing the data fed back from the write request into the storage device associated with the host if the write request is executed in the corresponding disk of the host. The storage device has the virtual disk file stored therein.

If the data is fed back from the read request, it will not be necessary to write the data fed back from the read request into the storage device associated with the host since the read request has not changed the content of the virtual disk file. Since the write request is executed, it is highly probably that the content of the virtual disk file is changed, and it is necessary to write the data fed back from the write request into the storage device associated with the host in order to ensure that the content of the host and the content of the virtual disk file of the storage device associated with the host are consistent.

The aforementioned request execution unit 405 and synchronous writing unit 404 achieve the effects of executing the read request or write request in the host if there is no failure of the disk drive of the host that stores the virtual disk file, and writing the data fed back from the write request into the storage device associated with the host in order to ensure that the content of the host and the content of the virtual disk file of the storage device associated with the host are consistent.

Figure 5:
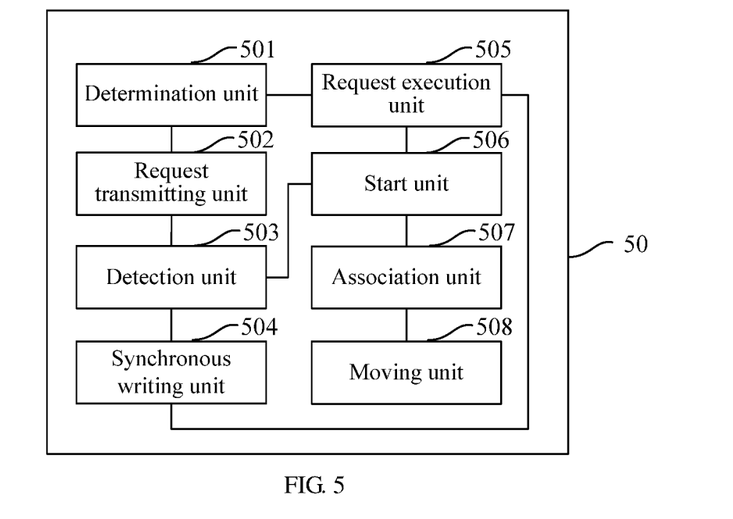
FIG. 5 is a schematic block diagram of a terminal in accordance with a second embodiment of the present disclosure.

With reference to FIG. 5 for a schematic block diagram of a terminal in accordance with the second embodiment of the present disclosure, the terminal 50 includes a determination unit 501, a request transmitting unit 502, a detection unit 503, a synchronous writing unit 504, a request execution unit 505, a start unit 506, an association unit 507, and a moving unit 508. The difference between the terminal 50 and the terminal 40 resides on that the start unit 506, association unit 507, and moving unit 508 are added. The determination unit 501, request transmitting unit 502, detection unit 503, synchronous writing unit 504, and request execution unit 505 are identical to those illustrated in FIG. 4, and thus their description will not be repeated.

The start unit 506 is provided for turning on all virtual machines of the storage device associated with the host if the failure of the corresponding disk of the host cannot be recovered, wherein these virtual machines include the virtual machines of the storage device and the virtual machines of the host stored in the storage device.

Preferably, when no recovery of the corresponding disk of the host has been made within a predetermined time, it is confirmed that the corresponding failed disk of the host cannot be recovered, wherein the predetermined time is preferably 10 days. All virtual machines of the storage device associated with the host are turned on, so as to prevent a too-long interrupt time of the virtual machine, which will affect the I/O operation of the virtual machine.

The association unit 507 is provided for associating another storage device with the storage device associated with the host.

The moving unit 508 is provided for moving all virtual disk files of the host from the storage device associated with the host into the other storage device.

Another storage device is associated with the storage device associated with the host while moving all virtual disk files of the host from the storage device associated with the host to another storage device, if the failure of the corresponding disk of the host cannot be recovered, so as to prevent losing the virtual disk file of the host and failing to maintain the normal operation of the virtual machine of the host.

Figure 6:
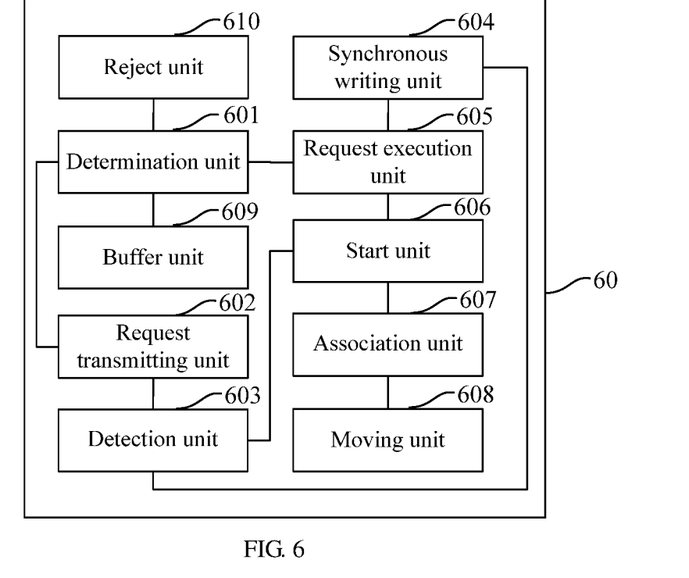
FIG. 6 is a schematic block diagram of a terminal in accordance with a third embodiment of the present disclosure.

With reference to FIG. 6 for a schematic block diagram of a terminal in accordance with the third embodiment of the present disclosure, the terminal 60 includes a determination unit 601, a request transmitting unit 602, a detection unit 603, a synchronous writing unit 604, a request execution unit 605, a start unit 606, an association unit 607, a moving unit 608, a buffer unit 609, and a reject unit 610. The major difference between the terminal 60 and the terminal 50 resides on that the buffer unit 609 and reject unit 610 are added. Wherein, the start unit 606, association unit 607, and moving unit 608 are identical to those illustrated in FIG. 5 and the determination unit 601, request transmitting unit 602, detection unit 603, synchronous writing unit 604, and request execution unit 605 are identical to those illustrated in FIG. 4, so that their description will not be repeated.

The determination unit 601 is provided for determining whether or not a congestion of the read request or write request occurs if the virtual machine sends a read request or a write request to the virtual disk file.

The buffer unit 609 is provided for buffering the read request or write request into a memory allocated by the host if there is no congestion of the read request or write request. The memory allocated by the host includes a static shared memory and a dynamic shared memory. Wherein, the static shared memory has a fixed capacity and a fast access speed; and the dynamic shared memory has a capacity variable dynamically with the change of the data size and an access speed slower than the access speed of the static shared memory.

Figure 7:
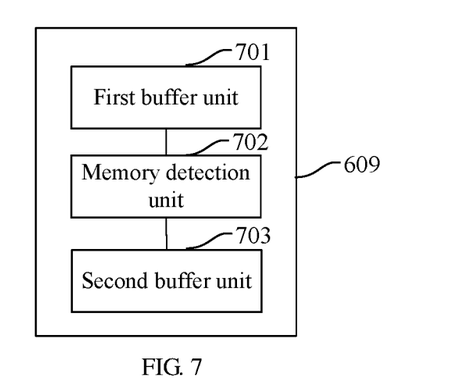
FIG. 7 is a schematic block diagram in accordance with a buffer unit of a terminal in accordance with the third embodiment of the present disclosure.

In FIG. 7, the buffer unit 609 includes a first buffer unit 701, a memory detection unit 702, and a second buffer unit 703.

The first buffer unit 701 is provided for buffering the read request or write request into a static shared memory allocated by the host.

The memory detection unit 702 is provided for detecting whether or not the memory built in the static shared memory is insufficient.

The second buffer unit 703 is provided for buffering the read request or write request into a dynamic shared memory allocated by the host if the memory of the static shared memory is insufficient.

The determination unit 601 is provided for determining whether or not a failure of the disk of the host having the virtual disk file stored therein occurs.

The request transmitting unit 602 is provided for sending the buffered read request or write request into the storage device associated with the host according to a predetermined order if a failure of the disk stored in the virtual disk file of the host occurs. The storage device has the virtual disk file stored therein in order to feed back the corresponding data. Wherein, the predetermined order is preferably the time sequence of generating the read request or write request.

The request execution unit 605 is provided for executing the buffered read request or write request in the corresponding disk of the host according to a predetermined order if no failure of the disk stored in the virtual disk file of the host occurs. Wherein, the predetermined order is preferably the time sequence of generating the read request or write request.

The reject unit 610 is provided for not to receiving the read request or write request for the virtual disk file from the virtual machine anymore if a congestion of the read request or write request occurs.

In this embodiment, when the virtual machine sends a read request or write request of the virtual disk file, it will be determined whether or not there is a congestion of the read request or write request. If there is no congestion, the read request or write request will be buffered into a memory allocated by the host, and the read request or write request will be executed according to a predetermined order to ensure an I/O balance of the visit of the virtual disk. If the congestion occurs, the read request or write request transmitted from the virtual machine to the virtual disk file will not be received anymore to prevent the issue of the congestion of the visit to the disk when there is a congestion of the read request or write request.

Figure 8:
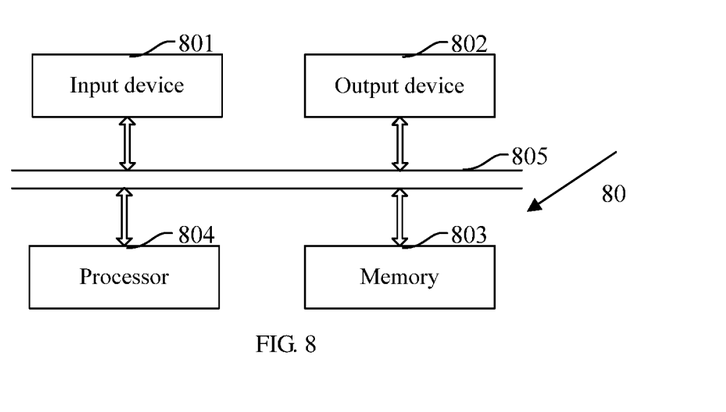
FIG. 8 is a schematic block diagram of a device in accordance with an embodiment of the present disclosure.

With reference to FIG. 8 for a schematic block diagram of a device in accordance with an embodiment of the present disclosure, the device 80 includes an input device 801, an output device 802, a memory 803 and a processor 804, and such input device 801, output device 802, memory 803 and processor 804 are connected through a bus 805.

The input device 801 is provided for a user to input a read request or write request of the virtual disk file. In an embodiment of the present disclosure, the input device 801 may be a keyboard, a mouse, a photoelectric input device, a sound input device, a touch input device, etc.

The output device 802 is provided for outputting the data fed back from the read request or write request. In an embodiment of the present disclosure, the output device 802 may be a display device, a display screen, a touch screen, a sound output device, etc.

The memory 803 is provided for storing programs and data of different functions. In an embodiment of the present disclosure, the data stored in the memory 803 includes the data of the host and the storage device associated with the host, a read request or a write request, or any other callable and operable programs and data. In an embodiment of the present disclosure, the memory 803 is a system memory such as a volatile memory (RAM), a nonvolatile memory (ROM, flash memory, etc.), or a combination of the two. In an embodiment of the present disclosure, the memory 803 may be an external memory such as a disk, an optical disk, a magnetic tape, etc.

The processor 804 is provided for calling the program and data stored in the memory 803 and executing the following operations:

If the virtual machine sends a read request or a write request to the virtual disk file, the processor 804 will determine whether or not there is a failure of the disk of the host that stores the virtual disk file. If a failure occurs, then the read request or write request will be sent to the storage device which is associated with the host and has the virtual disk file stored therein, so that the storage device can feed back the corresponding data. If the data fed back from the write request is received, then the processor 804 will determine whether or not the corresponding disk of the host is recovered, and the data fed back from the write request will be written into the corresponding disk of the host. If no failure of the disk stored in the virtual disk file of the host occurs, then the read request or write request will be executed in the corresponding disk of the host. If the write request is executed, the data fed back from the write request will be written into the storage device which is associated with the host and has the virtual disk file stored therein.

The processor 804 further executes the following operations:

If the virtual machine sends a read request or a write request to the virtual disk file, the processor 804 will determine whether or not there is a failure of the disk of the host that stores the virtual disk file. If a failure occurs, the read request or write request will be sent to the storage device which is associated with the host and has the virtual disk file stored therein, so that the storage device can feed back the corresponding data. If the data fed back from the write request is received, the processor 804 will detect whether or not the corresponding disk of the host is recovered. If the corresponding disk of the host is recovered, the data fed back from the write request will be written into the corresponding disk of the host.

The processor 804 further executes the following operation:

If the failure occurred in the virtual disk file stored in the disk of the host cannot be recovered, turning on all virtual machines of the storage device associated with the host.

The processor 804 further executes the following operations:

If the failure occurred in the virtual disk file stored in the disk of the host cannot be recovered, another storage device will be associated with the storage device associated with the host, and all virtual disk files of the host are moved from the storage device associated with the host to another storage device.

The processor 804 further executes the following operations:

If the failure occurred in the virtual disk file stored in the disk of the host cannot be recovered, all virtual machines of the storage device associated with the host will be turned on, and another storage device will be associated with the storage device associated with the host, and all virtual disk files of the host will be moved from the storage device associated with the host to the other storage device.

The processor 804 further executes the following operations:

If the virtual machine sends a read request or a write request to the virtual disk file, the processor 804 will determine whether or not there is a congestion of the read request or write request. If no congestion occurs, the read request or the write request will be buffered into a memory allocated by the host, and the processor 804 also determines whether or not a failure of the disk of the host having the virtual disk file stored therein occurs. If a failure occurs, the buffered read request or write request will be sent to the storage device associated with the host according to a predetermined order. The storage device has the virtual disk file stored therein in order to feed back the corresponding data.

The present disclosure also provides a computer readable storage medium, and the computer readable storage medium has one or more programs stored therein, and the one or more programs may be executed by one or more processors to carry out the following steps:

Detect whether or not a failure of the disk of the host that stores the virtual disk file occurs if the virtual machine sends a read request or a write request to the virtual disk file.

Send the read request or write request to the storage device associated with the host if a failure occurs. The storage device has the virtual disk file stored therein in order to feed back the corresponding data.

Detect whether or not the corresponding disk of the host is recovered if the data fed back from the write request is received.

Write the data fed back from the write request into the corresponding disk of the host if the corresponding disk is recovered.

Preferably, the step further includes the step of executing the read request or write request in the corresponding disk of the host if no failure of the disk stored in the virtual disk file of the host occurs; writing the data fed back from the write request into a storage device which is associated with the host and has the virtual disk file stored therein if the write request is executed, so that the storage device.

Preferably, the step further includes the step of turning on all virtual machines of the storage device associated with the host if the failure occurred in the virtual disk file stored in the disk of the host cannot be recovered.

Preferably, the step further includes the steps of: associating another storage device with the storage device associated with the host if the failure occurred in the virtual disk file stored in the disk of the host cannot be recovered; and moving all virtual disk files of the host from the storage device associated with the host to the other storage device.

Preferably, the step further includes the steps of: determining whether or not a congestion of the read request or write request occurs if the virtual machine sends a read request or a write request to the virtual disk file; buffering the read request or write request into a memory allocated by the host if no congestion occurs; determining whether or not a failure of the disk of the host having the virtual disk file stored therein occurs; sending the buffered read request or write request to the storage device which is associated with the host and has the virtual disk file stored therein according to a predetermined order if a failure occurs, so that the storage device can feed back the corresponding data.

For simplicity and clarification, people having ordinary skill in the art should be able to refer to the corresponding operations and procedures of the method as described above for the operating procedures of the aforementioned device, terminal, and unit, and thus they will not be repeated.

The present disclosure is illustrated by several embodiments, but the disclosed device and method may be implemented by other methods. The embodiments of the aforementioned device are provided for the illustrative purpose. The division of units is simply a division by logical functions, and the units used in actual implementations may be divided by other ways. For example, several units or components may be combined with each other or integrated into another system, or some technical characteristics are ignored or not exercised.

People having ordinary skill in the art should be able to understand that the illustrated units and algorithms disclosed in the foregoing embodiments can be implemented by electronic hardware, computer software, or a combination of the two. It is noteworthy that the hardware and software may be interchanged, and the description of this specification has given a general description to illustrate the assembly and steps of the disclosure. The choice of using hardware or software depends on specific applications and design limitations, and professionals may use different methods for different specific applications to achieve the function of the disclosure, but such implementation should not be considered to fall beyond the scope of the present disclosure.

In the embodiments of the present disclosure, the disclosed terminal and method may be implemented by using other methods. For example, the device disclosed in the embodiments is just used for illustrative purpose only, and the division of the unit is just a logical division, and actual implementations may have other different divisions. One or more units or components may be combined or integrated into another system, or some of the technical characteristics may be ignored or not executed. In addition, the connection relation between them may be a direct connection or an indirect connection through an interface, a device, or a unit, and such connection may be an electrical connection, a mechanical connection, or any other form of connections.

The separated parts may or may not be physically separated, and may be disposed at a place or distributed in a plurality of network units. A part or the whole of the technical solution of the embodiments of the present disclosure may be selected and used as needed to achieve the purpose of the disclosure.

In addition, the functional units of the embodiments of the present disclosure may be integrated into a processor or physically and individually existed, or two or more units may be integrated into a unit. The foregoing integrated units may be implemented by hardware or software. The integrated units may be used or sold as an independent product and stored in a computer readable storage medium. Based on this principle, the technical solution of the present disclosure may be implemented in the form of a software product stored in a storage medium, and this products includes a plurality of instructions for driving a computer device (which is a personal computer, a server, or a network device) to execute the whole or a part of the steps as described in the embodiments of the present disclosure.

The aforementioned storage medium includes a USB disk, a removable hard disk, a read only memory (ROM), a random access memory (RAM), a disk, an optical disk, or any other storage medium for storing program codes.

While the disclosure has been described by means of specific embodiments, numerous modifications and variations could be made thereto by those skilled in the art without departing from the scope and spirit of the disclosure set forth in the claims.

What is claimed is:

1. A method for improving a performance of a virtual machine, comprising:
    determining whether or not a failure of a disk of a host having a virtual disk file stored therein occurs if a virtual machine sends a read request or a write request to the virtual disk file;
    if the failure occurs, sending the read request or the write request to a storage device which is associated with the host and has the virtual disk file stored therein so that the storage device is able to feed back corresponding data;
    detecting whether or not a corresponding disk of the host is recovered if the data fed back from the write request is received; and
    writing the data fed back from the write request into the corresponding disk of the host if the disk of the host is recovered;
    the method further comprising:
    determining whether or not a congestion of the read request or write request occurs if the virtual machine sends the read request or the write request to the virtual disk file;
    buffering the read request or write request in a memory allocated by the host if no congestion occurs;
    determining whether or not a failure of the disk of the host having the virtual disk file stored therein occurs; and
    sending the buffered read request or write request to a storage device, which is associated with the host and has the virtual disk file stored therein, according to a predetermined order if a failure occurs, so that the storage device is able to feed back corresponding data.

2. The method of claim 1, further comprising:
    executing the read request or write request in a corresponding disk of the host if no failure of the disk of the host occurs; and
    writing the data fed back from the write request into a storage device associated with the host and has the virtual disk file stored therein if the write request is executed.

3. The method of claim 1, further comprising the step of turning on all virtual machines of the storage device associated with the host if the disk of the host cannot be recovered.

4. The method of claim 1, further comprising:
    associating another storage device with the storage device associated with the host if the failure occurred in the virtual disk file stored in the disk of the host cannot be recovered; and
    moving all virtual disk files of the host from the storage device associated with the host to the another storage device.

5. A device, comprising a processor, and an input device, an output device, and a memory, coupled to the processor; wherein the input device is provided for a user to input into a read request or a write request into a virtual disk file;
    the output device is provided for outputting data fed back from the read request or write request;
    the memory, is provided for storing program data of the host and the storage device associated with the host, the read request or write request, and other callable and operable program data; and
    the processor, is provided for calling the program data stored in the memory and executing the steps of determining whether or not a failure of a disk of a host having a virtual disk file stored therein occurs if a virtual machine sends a read request or a write request to the virtual disk file;
    if the failure occurs, sending the read request or the write request to a storage device which is associated with the host and has the virtual disk file stored therein so that the storage device is able to feed back corresponding data;
    detecting whether or not a corresponding disk of the host is recovered if the data fed back from the write request is received; and
    writing the data fed back from the write request into the corresponding disk of the host if the disk of the host is recovered;
    wherein the processor further executes the steps of:
    determining whether or not a congestion of the read request or write request occurs if the virtual machine sends the read request or the write request to the virtual disk file;
    buffering the read request or write request in a memory allocated by the host if no congestion occurs;
    determining whether or not a failure of the disk of the host having the virtual disk file stored therein occurs; and
    sending the buffered read request or write request to a storage device, which is associated with the host and has the virtual disk file stored therein, according to a predetermined order if a failure occurs, so that the storage device is able to feed back corresponding data.

6. The device of claim 5, wherein the processor further executes the steps of:
    executing the read request or write request in a corresponding disk of the host if no failure of the disk of the host occurs; and
    writing the data fed back from the write request into a storage device associated with the host and has the virtual disk file stored therein if the write request is executed.

7. The device of claim 5, wherein the processor further executes the step of:
    turning on all virtual machines of the storage device associated with the host if the disk of the host cannot be recovered.

8. The device of claim 5, wherein the processor further executes the steps of:
- associating another storage device with the storage device associated with the host if the failure occurred in the virtual disk file stored in the disk of the host cannot be recovered; and
- moving all virtual disk files of the host from the storage device associated with the host to the another storage device.

9. A non-transitory computer readable storage medium, provided for storing one or more programs executed by one or more processors, and executing the steps of:
- determining whether or not a failure of a disk of a host having a virtual disk file stored therein occurs if a virtual machine sends a read request or a write request to the virtual disk file;
- if the failure occurs, sending the read request or the write request to a storage device which is associated with the host and has the virtual disk file stored therein so that the storage device is able to feed back corresponding data;
- detecting whether or not a corresponding disk of the host is recovered if the data fed back from the write request is received; and
- writing the data fed back from the write request into the corresponding disk of the host if the disk of the host is recovered;

wherein the processors further execute the steps of:
- determining whether or not a congestion of the read request or write request occurs if the virtual machine sends the read request or the write request to the virtual disk file;
- buffering the read request or write request in a memory allocated by the host if no congestion occurs;
- determining whether or not a failure of the disk of the host having the virtual disk file stored therein occurs; and
- sending the buffered read request or write request to a storage device, which is associated with the host and has the virtual disk file stored therein, according to a predetermined order if a failure occurs, so that the storage device is able to feed back corresponding data.

10. The non-transitory computer readable storage medium of claim 9, wherein the processors further execute the steps of:
- executing the read request or write request in a corresponding disk of the host if no failure of the disk of the host occurs; and
- writing the data fed back from the write request into a storage device associated with the host and has the virtual disk file stored therein if the write request is executed.

11. The non-transitory computer readable storage medium of claim 9, wherein the processors further execute the step of: turning on all virtual machines of the storage device associated with the host if the disk of the host cannot be recovered.

12. The non-transitory computer readable storage medium of claim 9, wherein the processors further execute the steps of:
- associating another storage device with the storage device associated with the host if the failure occurred in the virtual disk file stored in the disk of the host cannot be recovered; and
- moving all virtual disk files of the host from the storage device associated with the host to the another storage device.

* * * * *